(No Model.)
E. WHITMORE.
VEHICLE RUNNING GEAR.
No. 307,510. Patented Nov. 4, 1884.
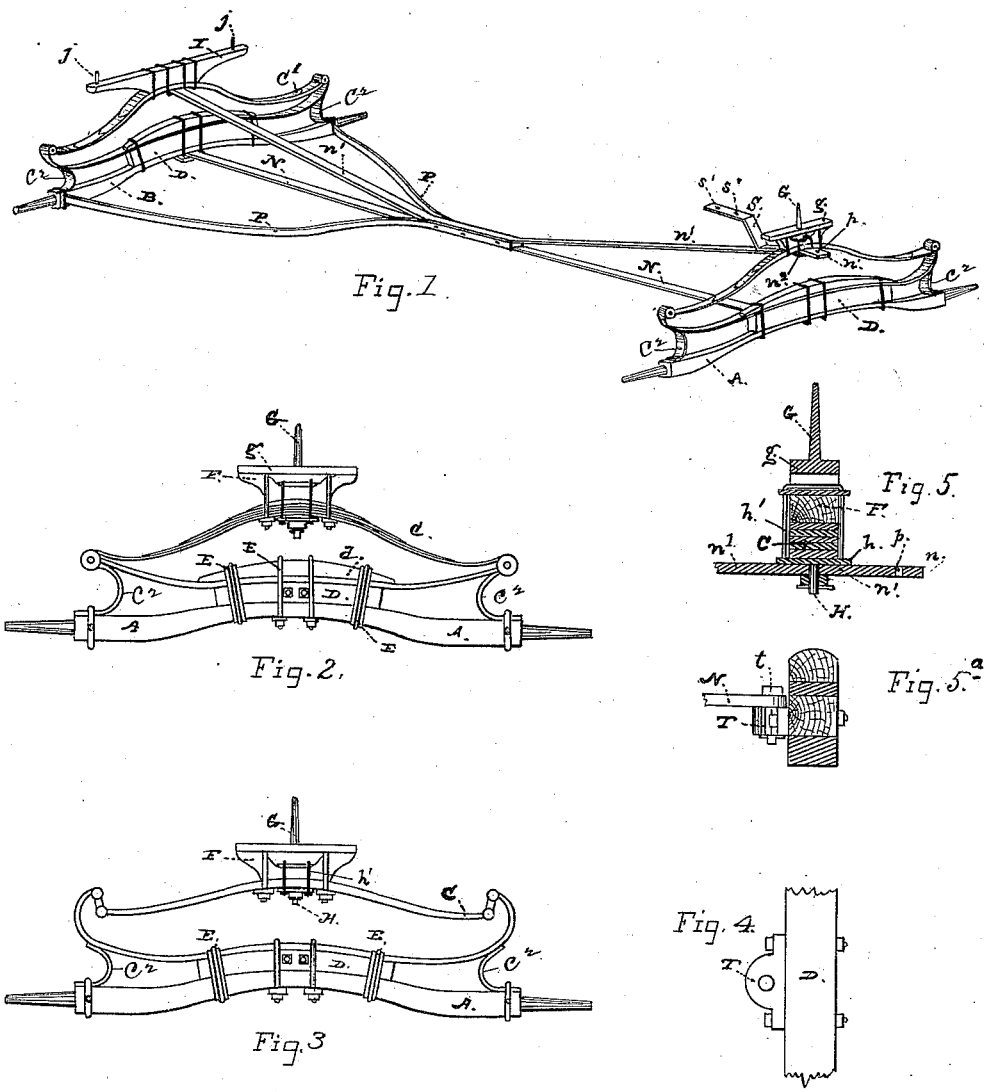

UNITED STATES PATENT OFFICE.

ENOCH WHITMORE, OF SAN FRANCISCO, CALIFORNIA.

VEHICLE RUNNING-GEAR.

SPECIFICATION forming part of Letters Patent No. 307,510, dated November 4, 1884.

Application filed December 17, 1883. (No model.)

*To all whom it may concern:*

Be it known that I, ENOCH WHITMORE, a citizen of the United States, residing in the city and county of San Francisco, State of California, have made and invented certain new and useful Improvements in Running-Gear for Vehicles; and I do hereby declare that the following is a full, clear, and exact description of my said invention, reference being had to the accompanying drawings, that form a part of this specification.

My invention relates to certain novel construction of running-gear of vehicles. The results sought to be attained are great elasticity, flexibility, and lightness, combined with strength, in the running-gear, and cheapness of manufacture.

In the drawings referred to, Figure 1 is a perspective view of the running-gear. Figs. 2 and 3 are front elevations showing different forms of spring combined with the front axle. Fig. 4 shows the swivel-connection on the front end of the reach. Figs. 5 and 5$^a$ are sections of Fig. 2, Fig. 5 being taken through the upper portion of the spring, and Fig. 5$^a$ through the lower.

A and B are the front and rear axles. The springs C are of the double-sweep kind, or of the common kind, as seen in Figs. 1 and 2, respectively. They are set up clear of the axles by wooden blocks or cushions D, that are interposed between spring and axle at about the center of the spring and axle, and the parts are then secured together by means of clips E. The ends of the springs are supported on short springs C$^2$ C$^2$, which bear upon the axle at one end and under the end of the springs at the other. If the bottom of the spring is curved, the top of the cushion-block D is of corresponding curvature; but if the bottom member of the spring is straight a saddle-block, $d$, having the same curvature as the bend of the axle, is set on the spring to take the clips, as shown in Fig. 3. The front spring carries a head-block, F, having a center-pin, G, secured on top by means of a base-plate, $g$, that is part of the pin, and is fastened to the block by clips or bolts. Immediately beneath the head-block, and in vertical line with its center-pin, is a short king-bolt, H, that is secured to the spring by clips $h'$ $h'$, that take over a plate, from which the king-bolt depends. The rear spring, C', has a bolster, I, that supports the rear end of the bed or platform, the front end being placed upon the head-block and its center-pin on the front spring. Connection of the rear end of the bed with the bolster is made by means of pins or bosses $j$ $j$ on the top of the bolster at the ends, and of straps or irons K, secured to the under side of the platform at the rear, and having eyes in the projecting ends to take over the studs $j$ $j$. A socket for the center-pin G is provided in a plate, M, on the under side of the bed, and an extension, $m'$, of the plate is carried out at the front beyond the bed, and is bent downward and backward upon itself to bring its end to the rear. The end connects with the end of a flat brace-iron, $n$, that is a member of the spring-reach N, an eye in each part receiving a pivot-bolt at $p$. Immediately behind this pivotal connection a hole at $n^2$ forms a socket for the king-bolt, and upon the brace just back of the socket and behind the spring is bolted a strap-iron, the free end properly crooked to rest against the under side of the bed. Screws $s'$ $s'$ pass through this strap into a plate on the bed-bottom. A similar brace, $n'$, is carried back and secured at the end to the rear spring, C'; but the fastening at this point is rigid, as no swiveling or turning of the rear axle is provided for. The spring-reach consists of the horizontal bar N, connected at front and rear ends to the two axles, the top connecting-bars, $n$ $n'$, and the curved lateral braces. The top bars spring from the horizontal bar at a point about midway between the two ends, and the curved side bars spring from this point backward to the rear axle, where they are clipped just inside the spindles. The front of the reach N is secured to the axle by a plate, T, having an eye for a bolt, $t$, that is passed through when the end of the reach and this eye are brought into line. Thus this front end of the reach has swivel-connections with the spring at the points $n^2$ $t$; but the rear end is fastened rigidly to the rear axle. These parts of the reach are constructed of flat spring-metal bars. This is the construction of the running-gear. The springs are supported on cushion-blocks, instead of being directly clipped to the axle, the effect of which is to give a degree of elasticity and relieve all the parts—such as the screws, bolts, joints, and fastenings—from direct jar and wrenching due to the movements of the axle when under travel. The reach has the quality of accommodating itself to uneven and irregular positions of the two axles, and yet while thus yielding to changes in the positions of one axle over the other of forming at all times a strong and sufficiently stiff connection between the two axles.

Having thus fully described my invention, what I claim, and desire to secure by Letters Patent, is—

1. A flexible and elastic running-gear for vehicles, consisting of the axles A B, the cushion-blocks D D, springs C C', short springs $C^2 C^2$ under the ends thereof, reach-bar N, connected to the axles, the bars $n'$ $n'$, attached at the outer ends to the springs, the lateral braces, the bolster-block I, to receive the rear end of the vehicle-bed, and the bolt G, to take into a socket on the front of the bed, the front ends of the bars N $n'$ being attached to the axle and its spring, respectively, by jointed connections T $t$ H, substantially as hereinbefore described.

2. The combination, with the vehicle-axle A, of the interposed cushion-block, the usual vehicle-spring mounted on said cushion-block, and the short springs $C^2 C^2$, set under the ends of the main springs, substantially as and for the purpose set forth.

3. In combination, the spring C, head-block F, plate $g$, provided with the bolt G, to take the vehicle-body, and the king-bolt H, for connection of the end of the bar $n'$ of the reach, substantially as hereinbefore described.

4. The studs $j$ $j$ on the bolster I of the rear axle, and the bolt G and strap-iron S on the spring of the front axle, forming attaching means for a body, as set forth.

ENOCH WHITMORE.

Witnesses:
EDWARD E. OSBORN,
JNO. L. TAGGARD.